Oct. 17, 1961 A. POLLAK 3,005,068
SUBMERSIBLE SUMP PUMPS AND SWITCH ASSEMBLIES THEREFOR
Filed Dec. 15, 1958 2 Sheets-Sheet 1
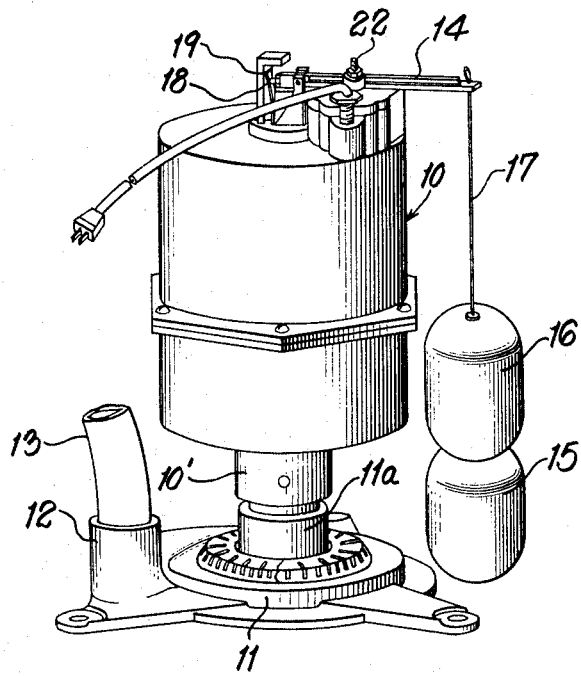
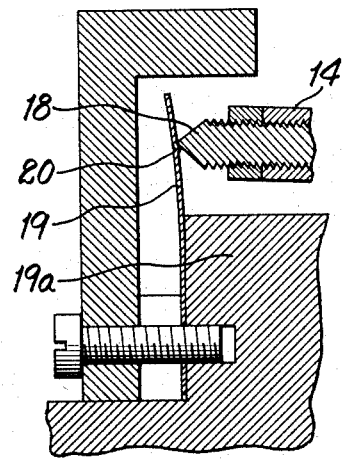
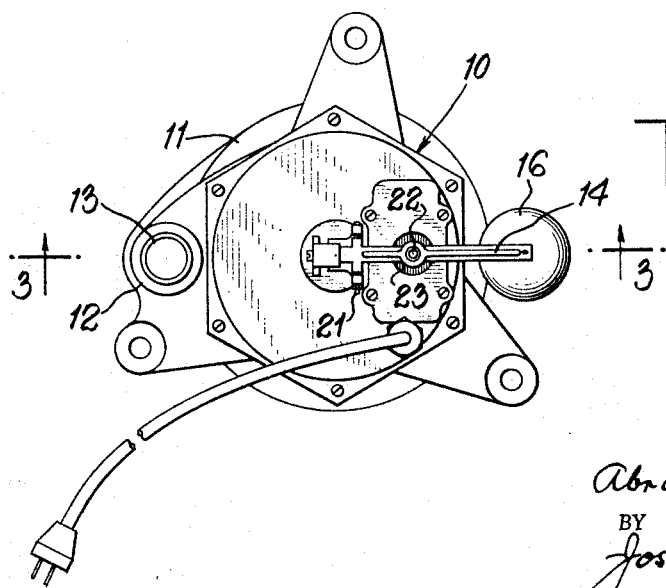
INVENTOR.
Abraham Pollak
BY
Joseph F. O'Brien
Attorney

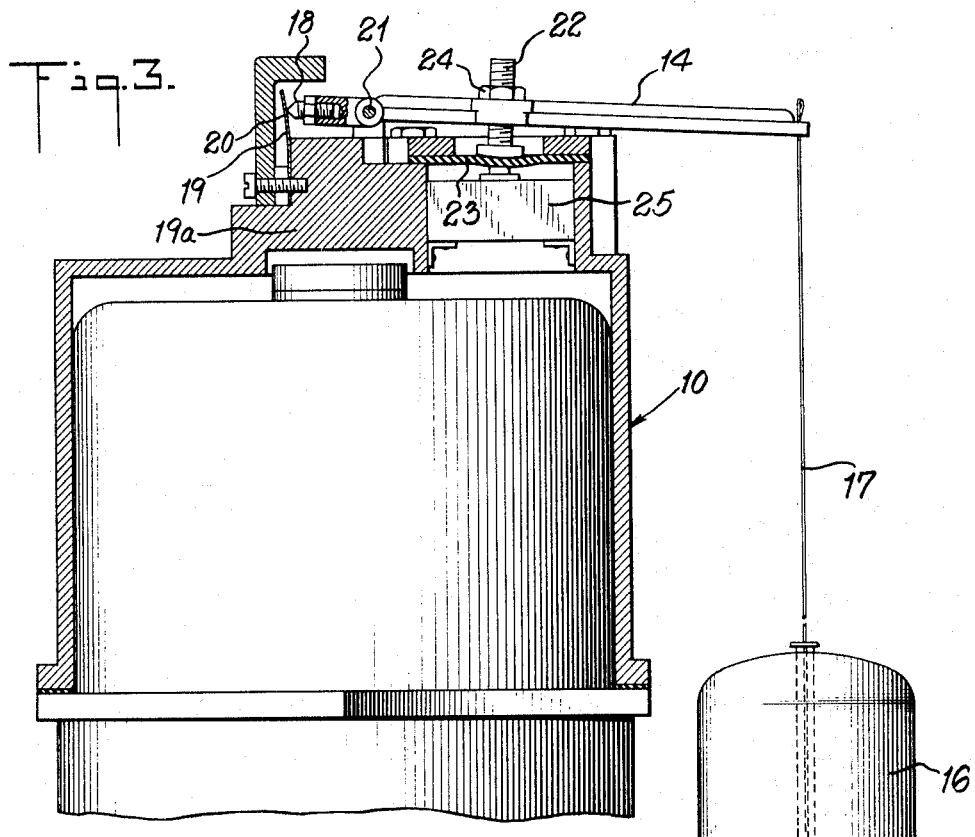
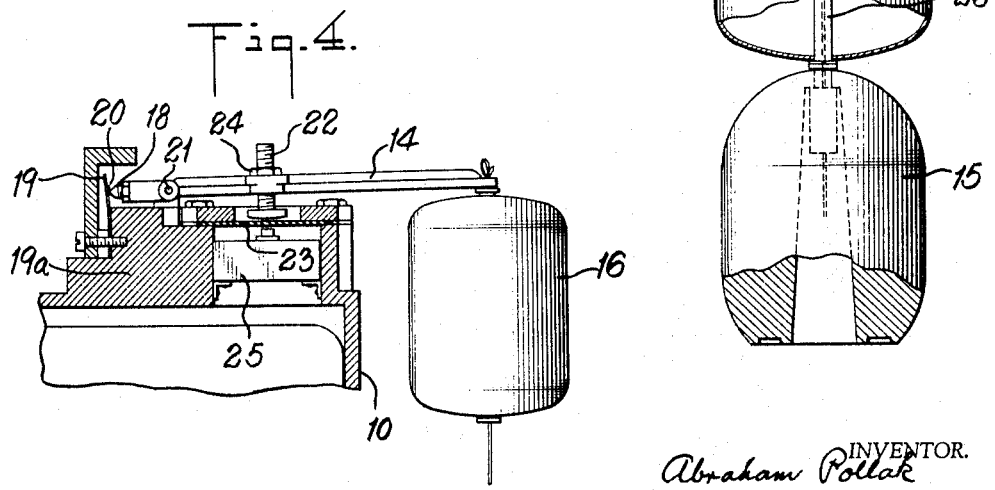

United States Patent Office 3,005,068
Patented Oct. 17, 1961

3,005,068
SUBMERSIBLE SUMP PUMPS AND SWITCH ASSEMBLIES THEREFOR
Abraham Pollak, Linfield, Pa.
Filed Dec. 15, 1958, Ser. No. 780,314
6 Claims. (Cl. 200—84)

This invention relates to improvements in submersible sump pumps and switch assemblies therefor.

It is necessary in sump pumps to utilize suitable switch assemblies embodying means for automatically starting the pump for the purpose of pumping water when such pumping is required because of the presence of water in a sump and for automatically stopping such pumping action when the water is exhausted from such sump.

In accordance with the present invention I utilize a switch mechanism which not only provides automatic means for pumping water where required and for automatically stopping the pumping action when water is exhausted from the sump, but provides for a lag or delay in starting so that the pump will not start until a predetermined amount of water has entered the sump, and furthermore such pump when running will not stop running until all the water in the sump has been exhausted and will then positively stop. For this purpose, my sump pump has an automatically-actuated switch assembly so arranged that when the water enters the sump and rises to a predetermined level therein, the switch assembly will upon overcoming said lag cause the pump to be immediately started or turned on and said pump will thereupon expel water until such water reaches another predetermined level, whereupon the switch assembly of the pump will overcome a reverse lag and automatically cause the power to be tripped and turned off.

While my switch assembly design in basic appearance looks similar to conventional switch assembly designs, the switch assembly and pump of my present invention has important advantages, one of which is that the switching action of my switch assembly is positive, and also the on and off action of such switch assembly in relation to the predetermined quantity of water in the sump takes place exactly at the position for which it is set and where it should take place. This feature avoids the possibility that turbulent water or water of varying viscosities will change the switching action. In the conventional pump such factors very often cause the pump to go on and off many more times than it should, and because the heaviest loads on the motor are imposed during the starting thereof it is imperative in an appliance of this type that the on and off action should take place as few times as possible.

With these and other objects in view, the invention comprises the combination of members and arrangement of parts so combined as to coact and cooperate with each other in the performance of the functions and the accomplishment of the results herein contemplated, and comprises in one of its adaptations the species or preferred form illustrated in the accompanying drawings, in which:

FIG. 1 is a perspective view in side elevation of a sump pump embodying my invention and showing the switch assembly mounted thereon;

FIG. 2 is a view in plan of the pump and switch assembly shown in FIG. 1;

FIG. 3 is an enlarged partly-broken-away section on the line 3—3 of FIG. 2, showing the switch assembly in off position and with an empty sump;

FIG. 4 is a fragmentary view on a line similar to FIG. 3 and showing the switch assembly in an operating position with a full sump; and FIG. 5 is a still further enlarged detail section showing the position of the lever member and spring switch assembly.

Referring now to these drawings which illustrate a preferred embodiment of my invention, 10 indicates a motor casing provided at its lower end with an integral bearing member 10' for the shaft (not shown) of the motor. The member 10' is positioned above an impeller casing 11 which is provided with a bearing hub 11ª positioned directly beneath the bearing member 10'. Rotation by the motor 10 of the impeller in the casing 11 causes water to be sucked or drawn downwardly into the impeller housing 11 and thence upwardly through the hose or pipe connection member 12 to a pipe 13 which will extend and conduct water to any suitable delivery place outside the sump.

In the preferred form of my invention illustrated, the sump pump 10 is provided with a switch assembly that is arranged automatically to cause water which enters the sump and rises to a predetermined level to operate the switch to cause the motor to be started and the pump to start pumping water. Water is thus expelled from the sump till the water therein reaches another predetermined level, whereupon the motor will be stopped and the pumping action will be cut off.

While the pump of my invention in basic appearance looks very similar to conventional pumps, my pump has important advantages: for example, my switching action is positive and the switching on and off action takes place or occurs exactly at the place set therefor and where it should take place. In conventional constructions, turbulent water or water of varying viscosities frequently changes the switching action so that such conventional pumps will very often go on and off many more times than is required. In an appliance of this type the heaviest loads on the motor are on starting, and it is imperative as an endurance factor for increasing the life of the product that the on and off switching action must take place as few times as possible.

In accordance with my invention, a conventional switch (not shown) is employed for turning on and off the power of the pump motor which is actuated by a pivoted lever 14 having its forward end engaging a leaf spring 19 while from the rear end of this lever 14 are suspended on a wire 17 two floats 15 and 16. One of these floats 15 is the heavier float and has about the same specific gravity as water while the other float 16 is a lighter plastic ball and is similar to the floats used in fishing. As water enters the sump, the heavier float 15, of course, becomes lighter by the amount of water it displaces and the lighter hollow plastic float 16, which has sleeve 26 through its center, slides upwardly on the wire 17 until it strikes the lever 14 to move the same into raised operative position and said lever is then retained in said raised operative position until the water has been exhausted notwithstanding dropping or removal of the light float 16. The heavier float is of such weight when the water has been exhausted to cause said float to be completely out of the same and in that position by its weight it is heavy enough to pull down the lever 14 and to turn off the power in the motor 10. This, however, does not occur because all the water is never completely pumped out of the sump to the bottom thereof and a turning-off of the water occurs when about two-thirds of said float rises into the air and one-third thereof remains in water. Said heavier float is thus suspended partly in air from the lever 14 and is not to any great extent immersed in water. The amount of power required for actuation of the switch lever varies and the weight of the heavier float 15 must under ordinary circumstances be carefully adjusted to make sure the power of the motor goes off when the water is exhausted to cause the sump to be nearly empty as hereinabove indicated.

In accordance with my invention the forward end of the actuating lever 14 is fitted with a stainless steel screw 18 terminating at said forward edge in a wedge-shaped end. This screw 18 is adjustable and has a bearing against a Phosphor bronze leaf spring 19 that is mounted and fastened at its lower end to the switch housing 19a and is free at its upper end. Said spring is provided with a slightly raised teat 20 at a point below the free end of the leaf spring 19. Said teat-point is centrally located between the edges of the leaf spring and the wedge-shaped end of the actuating lever is movable vertically along the middle of said spring 19 and functions when moved by the floats 15 and 16 as a switch and when the pump is in operation this wedge-shaped screw jumps over and under the teat 20 on the Phosphor bronze spring as the power in the pump goes on and off, thus causing a temporary lag or delay in the movement of the point of the switch lever in opposite directions over the Phosphor bronze spring 19. This arrangement permits me to use a heavier float 15 than could otherwise be employed. It also insures that the lever will be pulled down and the power of the pump will always go off fully so soon as there is no water left in the sump. This heavier float will also hold the pump in operation while there is any water in the sump.

My submersible sump pump thus comprises a completely sealed water-pumping and switch assembly and preferably uses a standard motor with built-in thermal-protection. All parts including the motor will thus be completely interchangeable, and service problems are reduced to a bare minimum as all units can be serviced in the field without great expense or time loss.

My automatic float switch control hereinabove described is dependable and positive, and the pump will operate quietly and efficiently under varying conditions, as for example when there is just a small amount of water in the sump or when the pump is completely submerged in water. My pump thus gives complete protection against water damage to the basements of homes, businesses or industrial installations.

The lever 14 of the switch assembly is pivoted in bearings 21 adjacent to the pointed nose hereinabove referred to, and is thus provided at one side of said pivot bearings with a short spring-contacting and switch-operating part and at the opposite side of said bearings has a long float-contacting portion. The long float-contacting portion of this lever 14 is provided with a screw-adjusting switch-operating member 22 adapted in adjusted position to abut against the top of the switch 25.

The on and off action of the switch assembly takes place as follows:

A conventional switch 25 is employed for turning on and off the power of the motor through the lever 14. The power of the pump is normally cut off by the weight of the floats acting through said lever 14. As water enters the sump, it first covers the lower heavier float 15. This heavier float has a specific gravity a little greater than that of water; and therefore as water enters the sump, the heavier float becomes lighter by a weight substantially similar to the amount of water it displaces but it is of such weight out of the water that it is heavy enough to operate the switch to turn off the power of the motor. When, however, said heavier float 15 is covered with water, it will not float but is almost weightless. As additional water enters the sump, the other lighter float 16 rises on the stainless steel wire 17 and trips the lever 14. The power of the pump then starts and removing the water begins. The lighter float 16 then goes downward on the stainless steel wire 17 and as the heavier lower float 15 comes out of the water said heavier float becomes heavier and again trips the switch off. I have found that in the case of turbulent water the switch lever 14 may rise before the lighter float 16 engages it, or it may go off before the heavier float comes out of the water. Therefore, on the forward end of the lever 14 at the point thereof I have provided a special stainless steel headed screw 18 which engages the Phosphor bronze leaf spring 19, preferably along a line at the middle portion thereof. The said leaf spring 19 is, as above specified, preattached to the upper motor casing 10. The said free portion of this spring 19 has a given degree of tension or resistance to bending pressure and I utilize and make adjustable this tension by a turning and moving the steel screw on the switch lever 14 in toward the pivot bearing or out toward said spring 19. A teat 20 is raised on said leaf spring in alignment with the line of engagement of the screw 18 at the nose of the lever with said leaf spring. This provides for movement in opposite directions across said teat or for both over and under action of the switch lever 14. In effect, the use of the teat simply puts a loading action on the switch lever 14 during movement to both on and off positions. Such loading action results in a slight lag or delay of the final movement of the switch plus a quick final jump upon overriding the obstacle. This mechanism eliminates the condition whereby a pump is likely to trip on or off before the prescribed setting thereof. The actual switching action takes place through a rubber diaphragm 23 which seals the opening in which the conventional switch 25 is located.

The long free operating part of the switch lever 14 is supported slightly above the top of the conventional switch 25 and of the pump casing by providing said free portion of the operating lever at a point intermediate the ends thereof with a screw member 22 having disposed beneath the same a contact head 22a and provided with an adjustable lock nut 24, said head 22a in the free part of said operating lever being adapted for movement by the float mechanism to actuate the conventional switch 25.

The heavier float weighs slightly more than the amount of water it displaces. Consequently, there is always a load on the switch lever. This load is resisted by a spring (not shown) which is built internally into the switch. It requires about ¼" of travel to compress this spring and actuate the switch. On any spring the amount of compression is proportionate to the load applied and as this heavy weight or float comes out of the water as the water level falls, the spring is gradually compressed until it reaches a point where the slightest action of the turbulence of the water will cause the switching action to take place. The leaf spring 19 acts like a trigger mechanism which holds the switch either open or closed so that only a predetermined load will cause it to be actuated.

This trigger action is very necessary. These pumps are built as short as possible. Consequently, the room for any float mechanism is very limited. In other words, the float does not have much room to move either up or down. It is therefore important that the lag between the on and off positions be as long as possible.

Having described my invention, I claim:

1. Float operated control means for sump pumps which comprises an electric switch to control the starting and stopping of the pump, a switch operating lever mounted to pivot on a horizontal axis to swing in one direction to open said switch and in the opposite direction to close said switch, a spring pressed element to engage and hold said lever yieldingly at a point between said opening and closing positions, and float operating means comprising a lower float of a density greater than that of the liquid to be pumped and suspended from said lever at a fixed distance therefrom and an upper float of less density than that of the liquid to be pumped and slidable from said lower float to said lever, the weight of said floats being sufficient to tilt said lever in one direction past the yielding engagement of said spring pressed element and the displacement weight of said upper float being sufficient to move said lever in the opposite direction past the yielding engagement of said spring pressed element.

2. The float operated control means of claim 1 in which said movable element of said lever is adjustably mounted thereon to adjust the pressure of said member against said spring.

3. The float control means of claim 1 in which said lever comprises an element mounted on an end of an arm of said lever and said spring is a leaf spring extending vertically in contact with said element and having a rounded projection extending into the path of said element.

4. The float operated control means of claim 1 comprising a wire depending from an arm of said lever and in which said lower float is mounted on said wire and said upper float is slidably guided on said wire.

5. The float operated control means of claim 4 in which said upper float has a vertical passage through which said wire extends.

6. The float operated control means of claim 1 in which the density of said lower float is greater than that of water.

References Cited in the file of this patent

UNITED STATES PATENTS

| | | |
|---|---|---|
| 2,203,555 | Von Hoorn | June 4, 1940 |
| 2,680,167 | Shewmon | June 1, 1954 |
| 2,747,043 | Schaefer | May 22, 1956 |
| 2,748,220 | Lung | May 29, 1956 |
| 2,752,461 | Euler | June 26, 1956 |
| 2,868,918 | Colette | Jan. 13, 1959 |